UNITED STATES PATENT OFFICE.

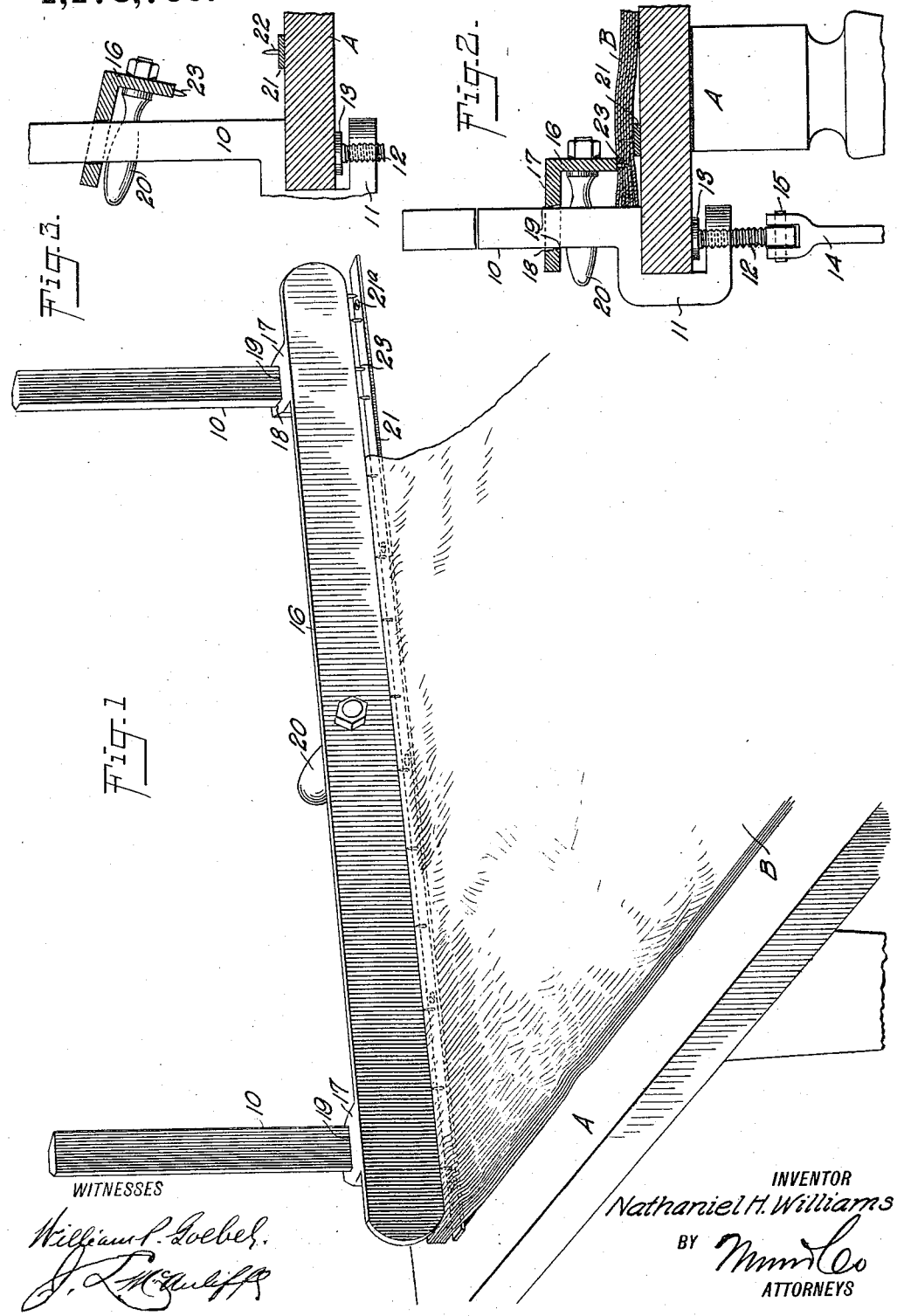

NATHANIEL H. WILLIAMS, OF MOBILE, ALABAMA.

DEVICE FOR CLAMPING CLOTH.

1,173,760.  Specification of Letters Patent.  Patented Feb. 29, 1916.

Application filed November 24, 1915. Serial No. 63,253.

*To all whom it may concern:*

Be it known that I, NATHANIEL H. WILLIAMS, a citizen of the United States, and a resident of Mobile, in the county of Mobile and State of Alabama, have invented a new and Improved Device for Clamping Cloth, of which the following is a full, clear, and exact description.

My invention relates to a clamp to be used by cloth cutters for clamping the cloth on a cutting table.

An important object of the invention is to provide means of simple and strong construction that may be readily adjusted to clamp the cloth and positively hold same from slipping.

A further object of the invention is to so clamp the cloth as to prevent unnecessary waste and thereby promote economy in the cutting of the goods.

The invention will be particularly explained in the specific description following.

Reference is to be had to the accompanying drawings forming part of this specification in which similar reference characters indicate corresponding parts in all the views.

Figure 1 is a perspective view of my improved clamp means illustrating the same in use; Fig. 2 is a transverse vertical section, showing the clamp elements adjusted to engage the cloth; and Fig. 3 is a view similar to Fig. 2 but showing the movable clamp element raised from the table to permit entrance or removal of the cloth.

In the illustrated practical embodiment of my invention, standards 10 are provided having means to clamp the same to the edge of a table A. In the illustrated construction, the lower end of each standard is formed with a U-shaped member 11 to receive the edge of a table, and a vertical clamp screw 12 has threaded engagement with the lower arm of the said U-shaped member. The upper end of the screw 12 is formed with a clamp head 13 to engage the underside of the table. Suitable means is provided for turning the screw 12, there being shown for the purpose, a forked lever 14 pivoted to trunnions 15 of the screw so that the lever may be brought to a horizontal position to turn the screw or be permitted to drop to a vertical position to present less obstruction.

An elongated clamp bar 16 is sliably mounted on the standards 10, said bar having rearwardly extending flanges 17 forming collars embracing the standards. Each collar has an oblique vertical opening 18, the direction of the opening being such as to produce sharp gripping edges 19 in front of the standards at the upper side of the collar 17 and in the back of the standards at the underside of the said collar. The disposition of the gripping edges 19 is such as to give the collars 17 a tendency to automatically engage the standards 10 in a way to resist an upward movement of the clamp bar 16, but, on the other hand, a tilting of the said clamp bar, as in Fig. 3, will bring the openings 18 parallel with the standards and permit a free sliding movement of the said bar on the standards. For the convenient raising and lowering of the bar 16 a suitable handle 20 is provided thereon.

To co-act with the clamp bar 16 a separate elongated bar 21 is provided, the same having suitable means whereby to secure it to the top of a cutting table A. In the example shown the bar 21 is secured by screws 21ª. The bar 21 is positioned immediately in front of the movable clamp bar 16 so that the latter, when in clamping position, will be disposed directly adjacent to the rear edge of the said bar 21. On the bar 21 a longitudinal series of upright pins 22 is provided at about the center of said bar; and, on the under side of the clamp bar 16, a longitudinal row of depending pins 23 is provided. It will be observed that the pins on the fixed and movable bars are in parallel lines and that the pins of the respective bars are in staggered relation. The position of the bar 21 is such that the front edges of the standards 10 will serve as a gage for the cloth B.

In practice, the movable clamp bar 16 having been raised and the goods having been placed against the standards 10 and brought down onto the fixed clamp bar 21 so that the teeth 22 of the latter will enter the goods, the bar 16 is lowered to a position adjacent to the rear edge of the fixed bar 21. The pins 23 of the movable bar enter the goods oppositely to the pins 22. In this way the goods will be firmly held against slipping when pulled by the cutter. It will be impossible for the cutter to waste over a limited amount of goods, the maximum being one and one-quarter inches in actual use.

The free sliding movement of the clamp 16 vertically on the standards 10, permits of the said clamp bar being positioned to afford ready clearance for the entrance of the goods and their removal. Also, the clamp bar can be quickly slipped from the upper ends of the standards whenever desired. The disposition of the gripping edges 19 effectively resist any tendency of the clamp bar to move upwardly and a firm hold of the cloth is insured.

The whole device may readily be detached from one table and quickly secured in position on another so that a cutter having two tables will not require cloth clamps on both tables.

Having thus described my invention I claim as new, and desire to secure by Letters Patent:

1. A cloth clamp of the class described, including standards having means at the lower ends thereof to secure the same to a table, a longitudinal clamp bar having means whereby the said bar may be secured in fixed position on the table in front of the standards, and a movable clamp bar having collars thereon at the rear side of the said clamp bar, slidably engaging the standards, the collars being adapted to be slipped onto or from the upper ends of the standards, the openings in the collars being oblique and presenting gripping edges respectively in front of the standards at the top of the collars and in the rear of the standards at the lower side of the collars, the movable bar, when lowered, being positioned adjacent to the rear edge of the fixed bar and the said fixed and movable bars having longitudinal rows of pins, the pins of the respective bars being in staggered relation.

2. A cloth clamp of the class described, including standards having means to secure the same to a table, a longitudinal clamp bar having means whereby to secure the same to a table in front of the standards and a movable clamp bar vertically slidable on the standards and rockable thereon, the said movable clamp bar having members embracing the standards and formed with means to resist upward movement thereof when the clamp bar is brought adjacent to the fixed bar, said fixed bar and movable bar having pins disposed oppositely to each other.

3. A cloth clamp of the class described, including standards having means at the lower ends thereof to secure the same to a table, a longitudinal clamp bar having means whereby the said bar may be secured in fixed position on the table in front of the standards, and a movable clamp bar having collars thereon at the rear side of the said clamp bar, slidably engaging the standards, the openings in the collars being oblique and presenting gripping edges respectively in front of the standards at the top of the collars and in the rear of the standards at the lower side of the collars, the movable bar, when lowered, being positioned adjacent to the rear edge of the fixed bar and the said fixed and movable bars having longitudinal rows of pins oppositely disposed.

In testimony whereof I have signed my name to this specification in the presence of two subscribing witnesses.

NATHANIEL H. WILLIAMS.

Witnesses:
MOSES KOHNS,
N. H. LEVINSOHN.